United States Patent [19]
Cuthrell

[11] Patent Number: 5,826,196
[45] Date of Patent: Oct. 20, 1998

[54] MULTI-LINE REMOTELY-ACCESSIBLE CONTROLLER FOR CORDLESS TELEPHONES

[76] Inventor: Gordon A. Cuthrell, 1340 E. 48th Pl., Apt. 404, Tulsa, Okla. 74105

[21] Appl. No.: 556,750

[22] Filed: Nov. 2, 1995

[51] Int. Cl.[6] .................................................. H04Q 7/26
[52] U.S. Cl. ........................................ 455/462; 455/561
[58] Field of Search .................................. 379/58, 61, 63, 379/34, 35, 164, 165, 185; 455/403, 462, 555, 465, 464, 560–561

[56] References Cited

U.S. PATENT DOCUMENTS

| | | | |
|---|---|---|---|
| 3,931,481 | 1/1976 | Jackson | 179/99 |
| 4,395,596 | 7/1983 | Leitman et al. | 179/99 |
| 4,490,583 | 12/1984 | Bednarz | 179/99 R |
| 4,538,029 | 8/1985 | Gazzoli et al. | 379/61 |
| 4,585,903 | 4/1986 | Schiller et al. | 455/462 |
| 4,628,153 | 12/1986 | Daly | 379/163 |
| 4,677,661 | 6/1987 | Van Gilluwe | 379/159 |
| 4,691,338 | 9/1987 | Makino | 379/61 |
| 4,805,203 | 2/1989 | Oda | 379/61 |
| 4,817,132 | 3/1989 | Chamberlin et al. | 379/165 |
| 4,922,526 | 5/1990 | Morganstein et al. | 379/164 X |
| 5,321,739 | 6/1994 | Higashiyama | 379/61 |
| 5,590,185 | 12/1996 | Sandler et al. | 379/164 |

*Primary Examiner*—Dwayne D. Bost
*Assistant Examiner*—William G. Trost

[57] ABSTRACT

A multi-line remotely-accessible Controller which allows the user of a conventional cordless telephone to selectively access any of a number of telephone lines in a private or in-house telephone system, through the use of the Dual-Tone Multi-Frequency (DTMF) signals transmitted by the handset of the cordless phone, to answer incoming calls on any system line, or allow the user to select any system line to originate outgoing calls.

13 Claims, 6 Drawing Sheets

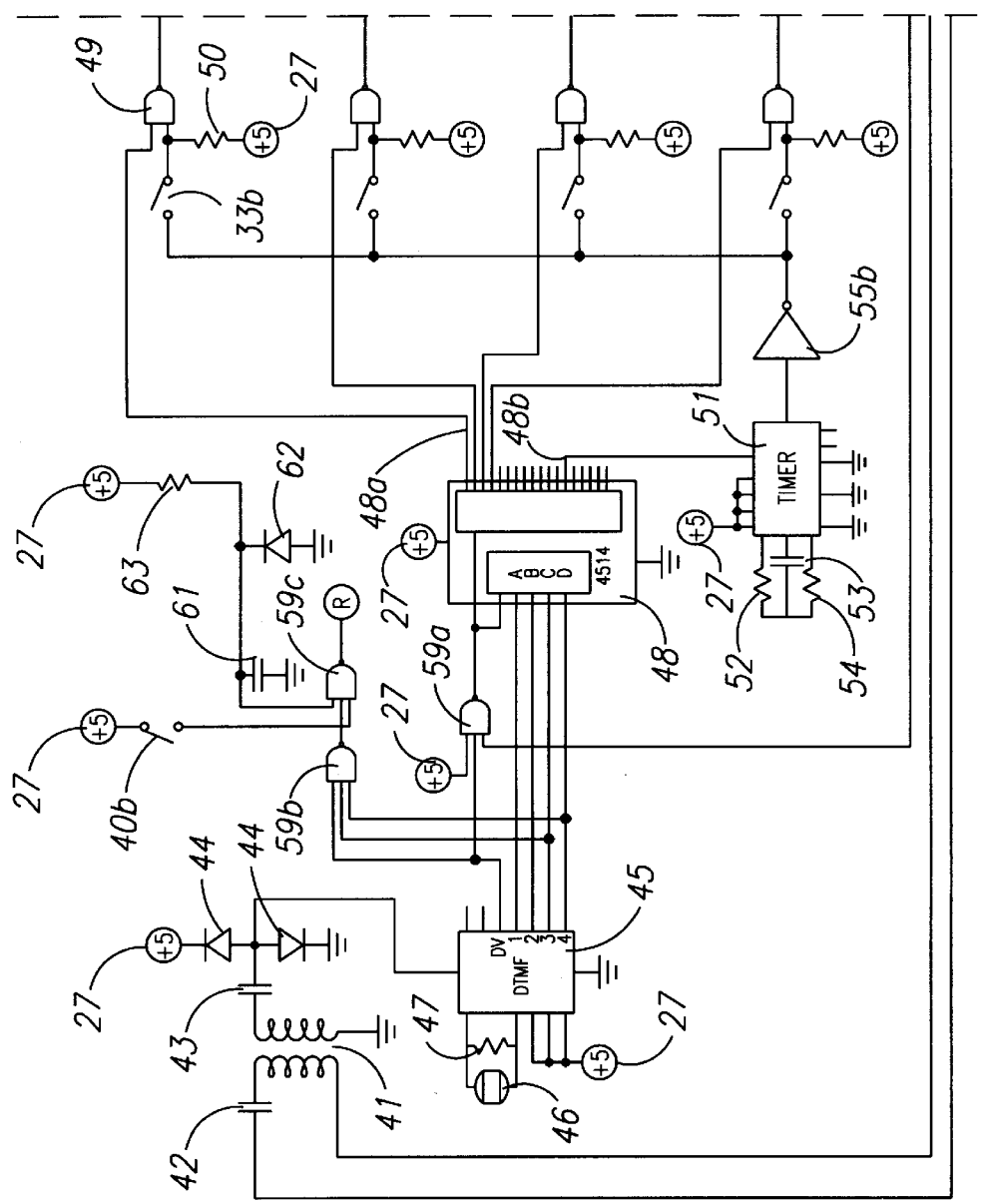

MULTI-LINE REMOTELY-ACCESSIBLE CONTROLLER FOR CORDLESS TELEPHONES

BACKGROUND OF THE INVENTION

The present invention generally relates to the field of telephonic communications and more specifically to the area of short-range radio-telephony (cordless telephones) and to a method and an apparatus to remotely access a plurality of wired telephone lines through the employment of the dialing signal generated by the portable handset.

FIELD OF THE INVENTION

The development of the cordless telephone has brought forth a new era in telephonic communication convenience. No longer encumbered or constrained by dragging and frequently tangled cords, the cordless phone user is now free to use the telephone anywhere within a wide operational radius. As the operational range of these devices has increased, these phones have begun to see service in an increasing number of commercial and industrial applications such as warehouses and manufacturing plants often covering a number of acres on one or more levels. Many of these establishments are served by multiple telephone lines to accommodate a large volume of both incoming and outgoing telephone traffic. The current state of-the-art of these cordless devices restricts them to service on only one, or at most two, telephone lines. This restriction has been inhibitive of the use of these phones in many establishments having multiple lines because of the requirement to manually switch lines at a central point and the inconvenience associated with that operation.

DESCRIPTION OF THE RELATED ART

Since the advent of multi-line telephone systems, a number of individuals have addressed the problem of switching phones and lines in an attempt to find a simple yet economical means of making all telephone instruments in a system accessible to all lines, and a number of interesting methods have evolved. Among those appearing in the prior art we find: U.S. Pat. No. 3,931,481 issued to Jackson which employs a plurality of manually-operable, spring-return, single-pole-single-throw selector switches, each switch being separately connected to a particular Central Office line. The corresponding SPDT switch must first be manually activated at the base unit. U.S. Pat. No. 4,395,596 to Leitman, et al, which provides line indicator lamp control and ringing for single-line telephone accessory equipment when connected to a multi-line telephone system. U.S. Pat. No. 4,490,583 to Bednarz, et al, which utilizes individual line selector switches for each telephone line. It also comprises a "hold" mechanism, a line condition indicator lamp, a conference switch and an internal ringing mechanism. Daly, in U.S. Pat. No. 4,628,153, disclosed a mechanically latched push-button assembly comprising a control box which allows access to multiple telephone lines, requiring manual line selection at the location of the control box. Van Gilluwe, in U.S. Pat. No. 4,677,661 disclosed a switching system which employs a micro-processor to monitor line status and for transferring calls to predetermined telephones.

Entering the era of the cordless phone, Makino disclosed, in U.S. Pat. No. 4,691,338, a line switching circuit for a communications system, which includes a cordless phone and gives priority of use to an ordinary wired or corded telephone associated with the cordless phone. Oda, in U.S. Pat. No. 4,805,203 teaches a telephone system comprising a plurality of telephone lines and an equal number of cordless telephone sets and a battery saving operation. Each of the cordless phones in this system performs intermittent receipt of calls at a particular timing assigned thereto and at a predetermined period synchronous with a signal generated in the base communications unit. Ever more sophisticated, U.S. Pat. No. 4,817,132 to Chamberlin, et al, comprises a "smart telephone" that employs an internal micro-processor to determine the various functions of a multi-line controller. Lastly, Weiser, et al, disclosed a telephone line switching interface unit which allows a remotely located telephone accessory unit to automatically receive a telephone signal received at a remotely located telephone set. This device, consisting of a fixed base transmit/receive unit and a portable transmit/receive unit, permits true "cordless" connection between various models of telephone sets and a cordless handset.

SUMMARY OF THE INVENTION

It is the object of the present invention to improve and simplify the operation of any cordless phone, or other telephone related device, by making said phone accessible to and from a predetermined number of telephone lines utilizing the dual-tone multi-frequency (DTMF) signals from the keypad of the cordless phone or other telephone related device to select the desired telephone line, through a controller which may be subscriber (self) installed. between the Central Office interface or demarcation terminal, and the subscriber's on-premise telephone equipment. The controller is compatible with any type 1A2 or electronic telephone system and any F.C.C. approved cordless phone. said controller is in compliance with all current rules of the Federal Communications Commission. This wireless control system was awarded FCC Registration Number 3M3USA-20565-KH-E on Apr. 4,1994.

THE PREFERRED EMBODIMENT OF THE INVENTION

Figure 1:
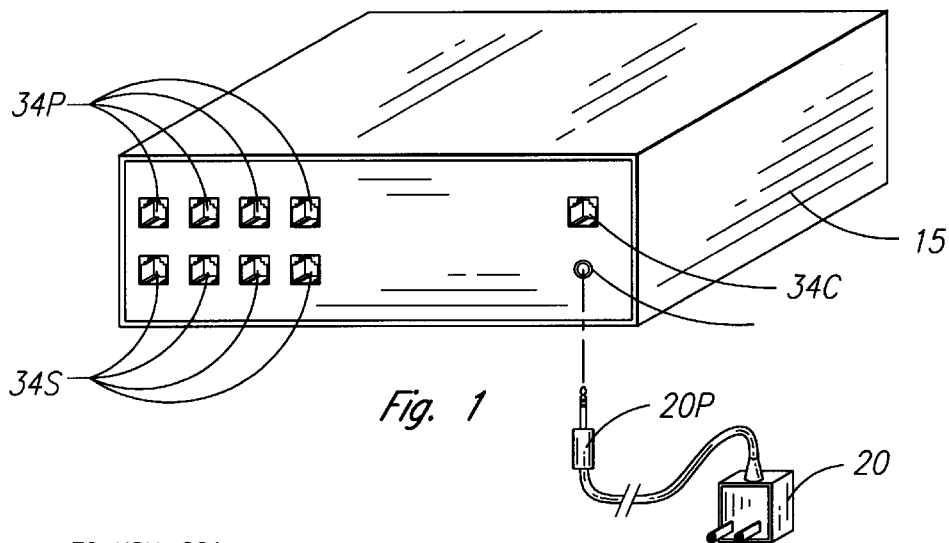
FIG. 1 is illustrative of the appearance of the present invention as it has been reduced to practice. This particular rendition being of a model capable of accommodating up to four telephone lines.

Referring now to the Figures of the Drawings it will be seen in FIG. 1 that the entire embodiment of the present invention is housed in a compact and unobtrusive enclosure of plastic or other suitable construction materials or a combination of such materials as fabrication efficiency may require. All telephone connections to the Controller are made by way of standard RJ-11 modular telephone jacks 34p (parallel), 34s (series) and 34c (cordless phone), all of which are typical. The power connection is accomplished through power jack 20j which accommodates the standard plug 20p provided for the output of 12 Volt A.C. wall transformer 20. No special radio-frequency (RF) shielding or grounding is required. As no user-servicable components are included in the apparatus, the enclosure may be of a sealed or non-openable configuration.

Figure 2:
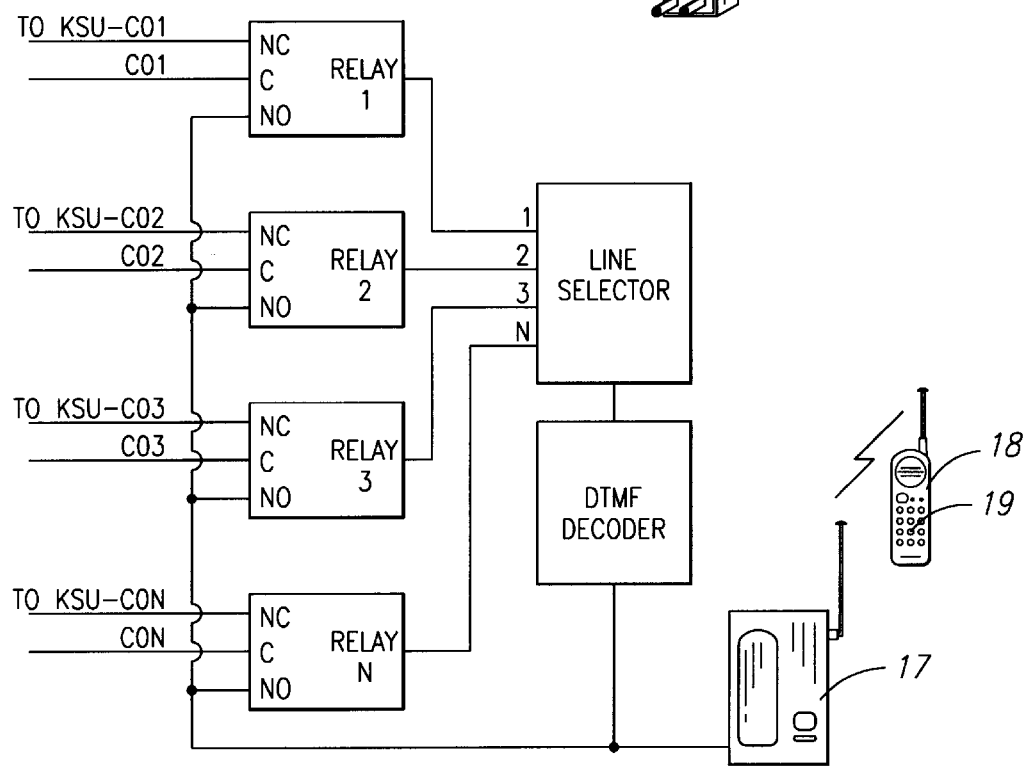
FIG. 2 is a block diagram depicting the basic principle and flow pattern of the present invention.

The block diagram of FIG. 2 illustrates, in the simplest possible manner, the routing of the telephone signals from the telephone company demarcation terminal 10 to and through the various components of an in-house or private multi-line telephone system.

Figure 3:
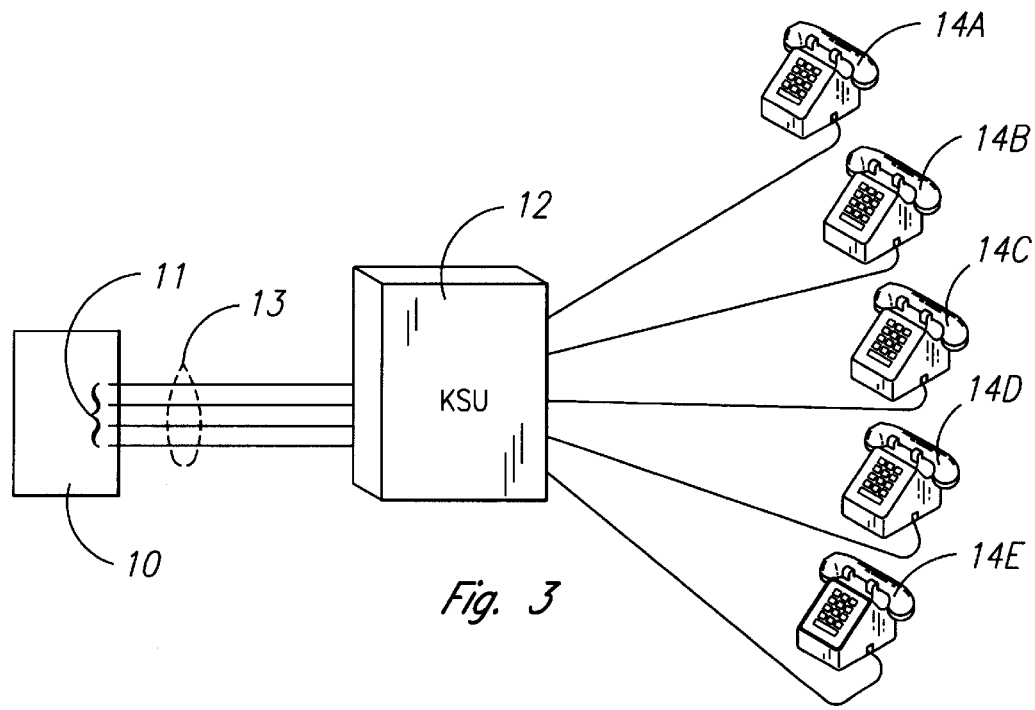
FIG. 3 is a block diagram of multiple telephone lines connected to existing on-premise telephone switching equipment in the conventional manner.

The diagram of FIG. 3 is representative of a typical in-house telephone system and depicts the entry of telephone CO lines 11 which are composed of hard wire pairs 13 to the KSU 12 of a conventional internal telephone system to selectively serve a number of telephone instruments 14a, 14b, 14c, 14d and 14e. The on-premise KSU 12 allows connection of any of the incoming pairs to any wired telephone instrument, in accordance with the design of the particular system.

Figure 4:
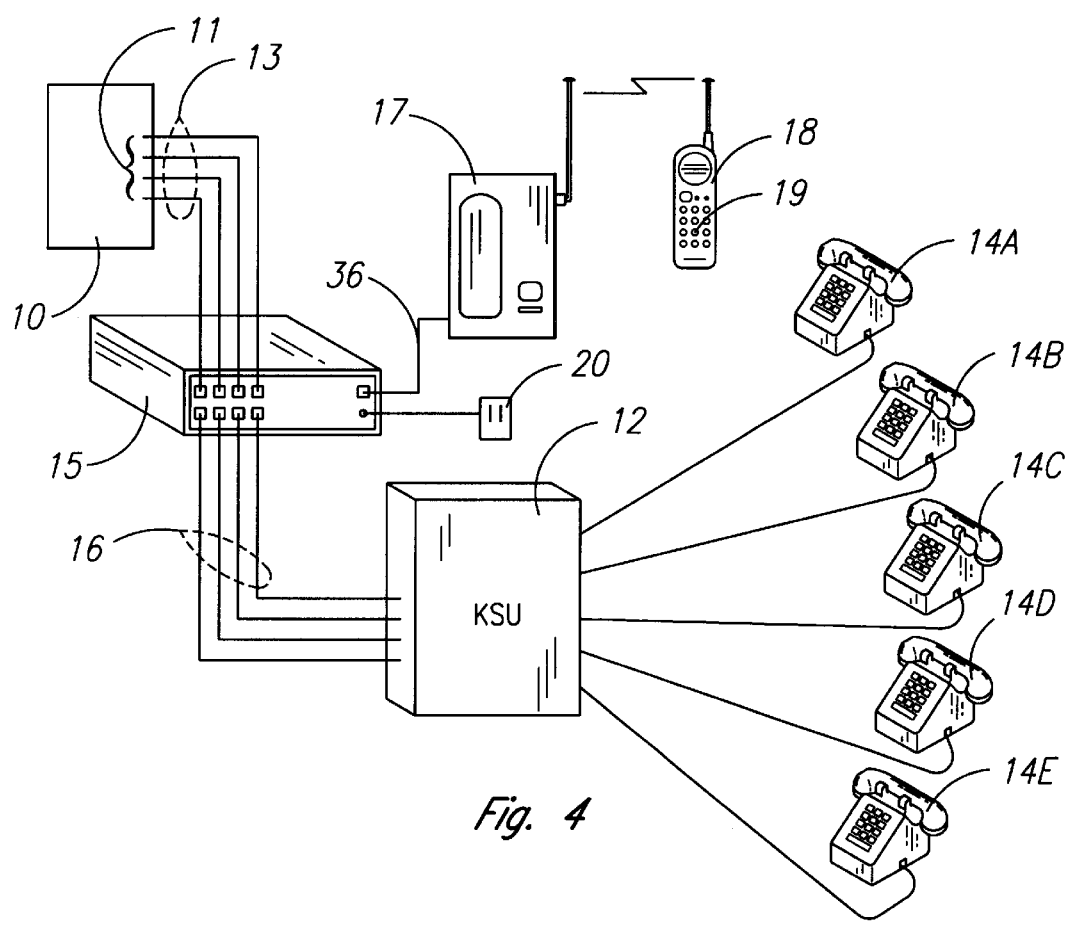
FIG. 4 is illustrative of one of two manners in which the Multi-Line Remotely Accessible-Controller 15 (hereinafter "Controller"), which is the present invention, may be connected, in series, to the Central Office lines (hereinafter "CO lines") 11 to allow privacy for both the cordless phone and the subscribers pre-existing telephone equipment Key Service Unit 12 (hereinafter KSU).

FIG. 4 illustrates multiple incoming CO lines 11 consisting of multiple hard-wire pairs 13 which enter and pass through the Controller 15 of the present invention in series and thence to the on-premise KSU 12 by means of hard-wire pairs 16. Thus connected, the cordless phone multi-line Controller 15 permits conversation privacy for both the duplex transmitter/receiver cordless phone base unit 17 and the existing phones 14a, b, c, d or e in the system, yet allows any of the lines to be accessed for incoming or outgoing calls by the cordless telephone base unit 17 and/or the cordless phone handset 18.

Figure 5:
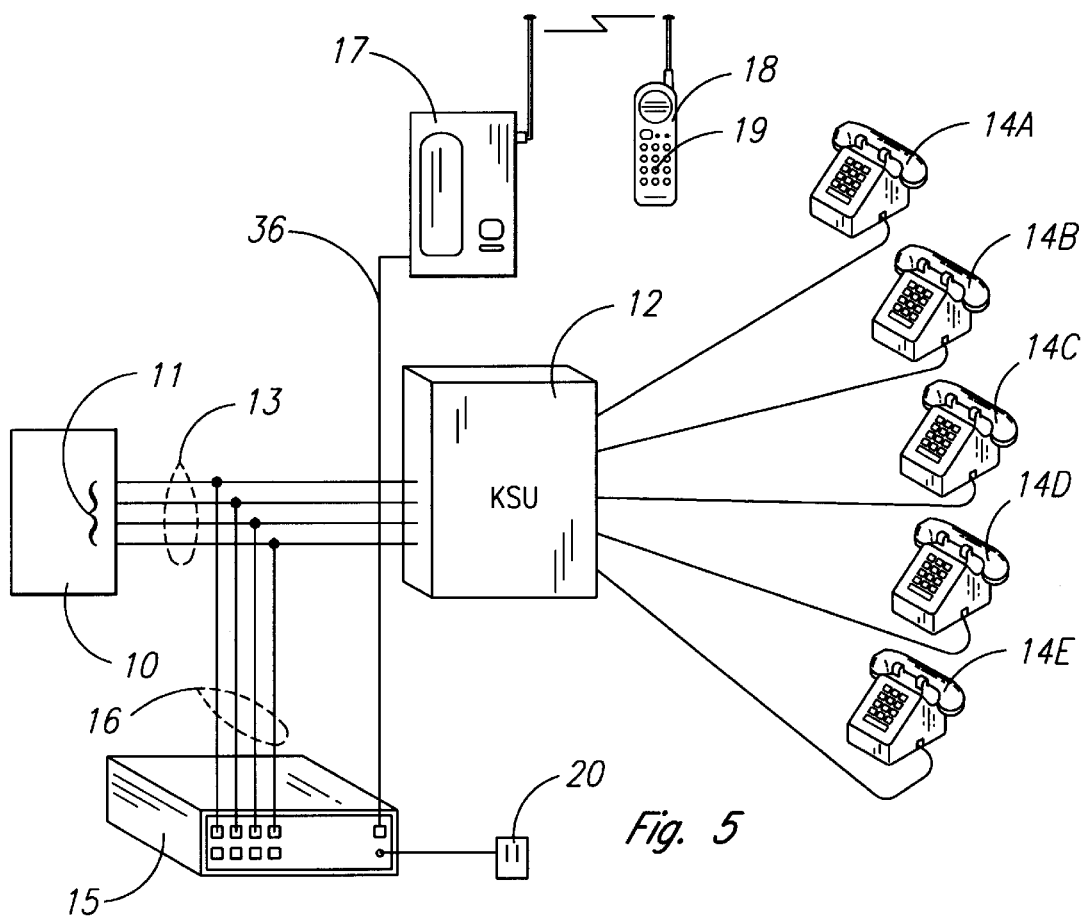
FIG. 5 illustrates the alternate manner of connecting the Controller of the present invention, in parallel, to CO lines to permit both the cordless phone and the pre-existing wired telephone equipment to be on the same line at the same time.

In FIG. 5, each of the hard-wire pairs 13 from the CO line 11 interface are connected in parallel to the multiline Controller 15 and the existing KSU 12. Connection in this manner permits both the cordless and the existing corded or wired telephones to access the same telephone line at the same time. Particular attention is directed to the fact that the function of the Controller 15 is passive until it is activated by an impulse from the dual-tone multi-frequency (hereinafter DTMF) signal generated by the cordless phone handset (hereinafter handset) 18, i.e., the incoming/outgoing messages simply pass-through Controller 15 when it is connected in series, or pass-by it, when said Controller is connected in parallel. The cordless phone base unit (hereinafter base) 17 is not connected to any wire pair 13 unless commanded to do so by the appropriate DTMF signal from the said base 17 or said handset 18.

Figure 6:
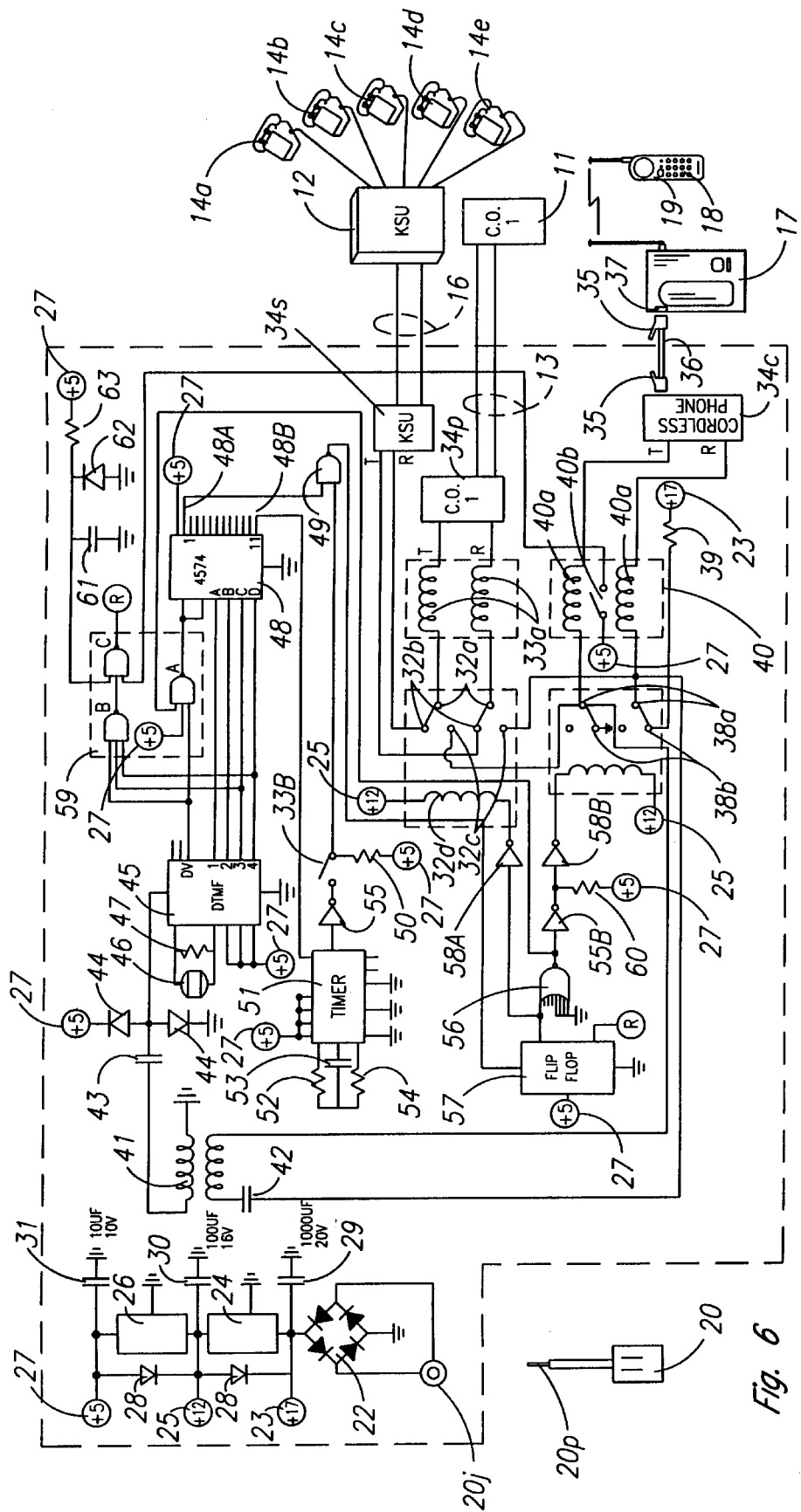
FIG. 6 is a schematic diagram illustrative of the manner in which the Controller operates. For the purpose of clarity, only one CO line is illustrated in this Figure, which is typical of the circuitry employed in the multi-line version of the Controller.

In accordance with the schematic diagram of FIG. 6, which illustrates the circuitry employed, the Controller 15 of the present invention functions as follows: CO lines 11, individually designated as telephone line pairs CO-1 through CO-N are connected in series to the input interface of 15 by means of modular telephone plugs inserted into corresponding modular telephone jacks of Controller 15, with a corresponding number of Current Sensing Relays, hereinafter designated as CSR-1 through CSR-N, which are in turn connected in series to the terminals of a similar number of Double-Pole Double-Throw relays designated as DPDT-1 through DPDT-N. The wire, designated as T, of each pair, CO-1 through CO-N, is connected to one Common C terminal of the appropriate relay DPDT-1 through DPDT-N while the wire designated as R of each pair CO-1 through CO-N is connected to other Common C terminal of the relay. The normally closed terminals of relays DPDT-1 through DPDT-N are connected to the correspondent output interface of Controller 15 and thence by means of modular connectors, as stated above, to the pre-existing on-premise telephone KSU 12. The normally open terminals of relays DPDT-1 through DPDT-N are connected together in a parallel fashion and thence, via the provided modular phone jack 34c, provided on the interface panel of Controller 15 to the input/output connector of base 17. Thus connected, incoming telephone calls are directed to the on-premise KSU 12 and to the wired telephones 14a, b, c etc., and conversation privacy is assured for both the cordless phone and the wired telephones in the system. Connecting Controller 15 in parallel with the incoming CO lines 11 as illustrated in FIG. 5 allows both the cordless phone and the existing telephones in the system to access the same telephone line simultaneously.

When multi-line Controller 15 and base 17 are connected to an appropriate source of electrical energy and the energy cells or batteries of the handset 18 are charged, and CO lines 11 (CO-1 through CO-N) are connected, by either of the methods indicated above, it is ready for service to select and connect any of the said lines to base 17 and the corresponding handset 18. Operation is accomplished in the following manner:

INCOMING CALLS

As previously stated, the function of the Controller is passive, therefore, any incoming calls are normally answered by a receptionist or an individual who normally remains at a fixed location and whose duties include answering the telephone. Upon receipt of a call for the cordless phone user, the receptionist may place the caller on "hold" and page the recipient of the call on the in-house audio system with a short message including the line number upon which the caller is waiting, e.g., "Ms. Cadwalader, line 2 holding please", if the caller has been placed on "hold", or alternatively, "Ms. Cadwalader, line 2 please", if the caller remains on the open line. Upon hearing the page, the cordless phone user turns the handset 18 "on", depresses the star or asterisk button "*" on dialpad 19 to retrieve the call from "hold" and depresses the keypad number corresponding to the calling line number, in this example, "2". The cordless phone is now connected to CO-2. When the conversation is finished, switching the handset 18 "off" terminates the connection and releases the line to the control of KSU 12.

OUTGOING CALLS

To initiate a telephone call from the cordless phone, it is only necessary to activate the handset 18, by placing the handset power switch in the "on" position and depressing the number on dialpad 19 corresponding to the CO line 11 desired. If no dial tone is heard, the line is in use and another line may be selected by simply depressing another appropriate number on dialpad 19. If all lines are in use and it is desired to interrupt an on-going call to obtain a line, depressing the star "*" button activates the command override feature, which will connect the cordless phone to the CO line 11 corresponding to the next digit depressed. Upon termination of the conversation, moving the power switch of the handset 18 to the "off" position releases the line to the control of the KSU 12. It is to be noted that a plurality of handsets may be employed, all of which may access the Controller as stated above. Only one at a time, however, may access the Controller and/or the telephone lines due to the single line capability of the radio link.

Figure 7B:
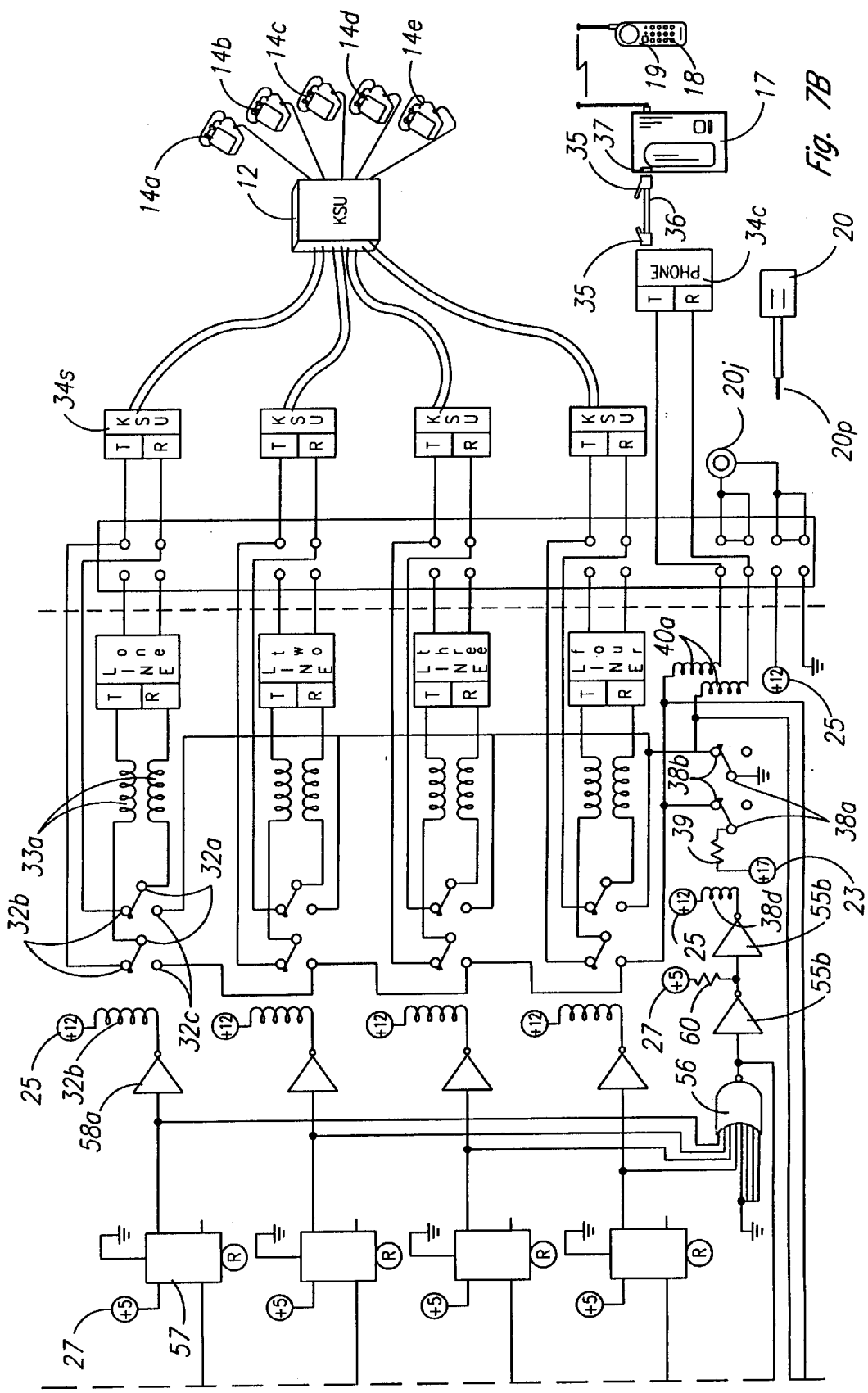
FIG. 7 is a schematic diagram illustrative of the manner in which a plurality of CO lines are accommodated by duplicating and inter-connecting identical circuits and the manner in which this is accomplished. In this Figure, four CO lines are illustrated.

Referring now to FIG. 7 which illustrates the complete circuitry of the Controller 15 of the present invention in a version designed to accommodate four CO lines 11, there follows a more technically specific explanation of the various components and their functions.

The Controller 15 of the present invention allows any handset 18, through it's corresponding duplex transmit/receive base 17, to remotely access any one of a plurality of telephone CO lines 11 including those connected to an in-house or private telephone system KSU 12, by depressing the appropriate numeral on dialpad 19. The Dual-Tone Multi-Frequency (hereinafter DTMF) signal from said dialpad 19 is interpreted by said Controller 15, which connects the corresponding CO telephone line 11 to the base unit 17 and ultimately to the handset 18. For example, to select line 3, turn the handset 18 "On" and then depress the numeral 3 on dialpad 19. The base 17 is now connected to line 3 and communication is established by radio signal through the duplex transmit/receive function of said base 17 and the duplex transmit/receive function of the handset 18. The apparatus of the present invention is configured to serve multiple telephone lines, however, for the purposes of this explanation only one telephone line, which is typical of all others, will be discussed.

Electrical energy to power Controller 15 is taken from conventional 115/230 Volt Alternating Current mains and is transformed to 12 Volts AC (VAC) by a conventional wall transformer 20 from whence it passes by two-conductor wire to a standard plug 20p inserted in a standard receptacle or "jack" 20j which is located in the faceplate or front panel of Controller 15. A bridge rectifier 22 converts the incoming unregulated 12 VAC to +17 Volts DC (hereinafter VDC) 23. A 7812 voltage regulator 24 reduces the voltage to +12 VDC 25 and a 7805 voltage regulator 26 reduces the voltage to +5 DC 27. Two 1N4148 diodes 28 separate the various +DC voltages, and each voltage is capacitively coupled to ground. The +17 VDC 23 is coupled to ground with a 1000 ufd, 20 volt capacitor 29. The +12 VDC 25 is coupled to ground with a 100 ufd, 16 volt capacitor 30. The +5 VDC 27 is coupled to ground with a 10 ufd, 10 volt capacitor 31. The +17 VDC 23 is used to provide initial voltage to the cordless phone base unit 17. The +12 VDC 25 is used to power the 12 VDC double pole-double-throw (DPDT) relay 32. The +5 VDC 27 powers the integrated circuit (IC) chips 45, 48, 49, 51, 55, 56, 57, 58 and 59. These IC chips are utilized to receive and intrepret voltage signals and then to perform the particular function of that particular IC chip circuit. A +5 VDC level will hereinafter be referred to as a "high." A zero volt or ground status will hereinafter be referred to as a "low."

Telephone lines consist of two-conductor hardwires from the telephone company's Central Office (CO) through which voice and data are transmitted via electrical impulses. These two conductors are commonly known in the telephone industry as "Tip" (T) and "Ring" (R). The T and R of each telephone CO line 11 connected to Controller 15 are each connected to one of the two identical co-functioning coils 33a of a current sensitive relay 33, such as a (TELTONE)™.

949-01, with one conductor being connected to each side of a coil 33a. The other side of these two coils 33a are connected to the common contacts 32a of a 12 VDC DPDT relay 32 which diverts the path of a particular CO line 11 to either the existing hard wired telephone equipment KSU 12 via the normally closed contacts 32b or to base 17 and ultimately to handset 18 via the normally open contacts 32c. Each pair of the normally open contacts 32c for all the DPDT relays 32 that are connected to CO lines 11 associated with Controller 15 are connected together in a consistent parallel manner ("Tip" to "Tip" and "Ring" to "Ring"). This T and R network is also connected to the RJ-11 telephone interface 34 which is a standard modular telephone jack. Inter-connection between CO lines 11, Controller 15, KSU 12 and base 17 is accomplished through the employment of two-conductor cables 36 having standard modular telephone plugs 35 installed on each end thereof. This arrangement permits the installation of the RAC 15 without the use of tools of any kind. [Note: These two-conductor cables and modular telephone plugs are the standard inter-connection means employed in the industry and are not to be considered part of the present invention.]

A second DPDT relay 38 is connected between the RJ-11 telephone interface 34 of Controller 15 and the network of DPDT relays 32 that control the path of the active telephone lines CO 11. The normally closed contacts 38a of relay 38 are connected to the "Tip" and "Ring" network. The common contacts 38b of this relay have the "Ring" contact connected to ground, and the "Tip" contact is connected to one leg of a 1K ohm resistor 39. The other leg of said resistor 39 is connected to a +17 VDC power supply 23. The purpose of introducing this particular voltage at this particular location is to provide a +DC power supply to base 17, thus simulating telephone line voltage as though said voltage originated in the telephone company Central Office. Some cordless phones require that telephone line voltage be present at the RJ-11 telephone interface 37 of the base 17 before said base unit will accept any radio signals from handset 18. Some cordless phones do not require this voltage, but the presence of this voltage does not affect their operation. The +17VDC power supply 23 becomes disconnected from the "Tip" and "Ring" network of the cordless phone base unit 17 upon the selection of, and latching onto, an active telephone CO line 11. The "Tip" and "Ring" network from base 17 are connected to the two identical, co-functioning coils 40a of a current-sensitive relay 40 used to monitor when handset 18 is turned "off". The distal side of said coils 40a are connected to the primary side of a 1:1,600 ohm transformer 41 with the "Tip" side first passing through a 0.33 ufd capacitor 42. On the secondary side of said transformer 41, one leg of the transformer is grounded. The other leg is connected in series to 0.01 ufd capacitor 43 which is then connected to a half-wave rectifier 44 and then becomes the Ain input of a DTMF decoder chip 45 such as a (MOTOROLA)™. 145436. This DTMF decoder chip 45 requires that a 3.5967 MHz crystal 46 be connected across the Xin and Xout lead thereof. Also connected across said Xin and Xout leads is a 1 megohm resistor 47. Leads En, Vdd and X of said decoder chip 45 are connected together and are also connected to +5 VDC power supply 27. The ground lead of said chip 45 is connected to ground, while leads ATB and GT are not connected. The four outputs D1, D2, D3, and D4 of decoder chip 45 are respectively connected to the input leads A, B, C and D of a Binary-to-Hexidecimal converter chip 48, such as a (MOTOROLA)™. 4514. A +5 VDC power supply 27 is connected at Vin. The ground lead is connected to ground. The 16 outputs of chip 48 are labeled YO to Y15. There is a one-to-one correspondence with each numeral on dialpad 19 to the output leads of Binary-to-Hexidecimal converter chip 48. For example, depressing the numeral "1" on dialpad 19 results in a change in output from the Y-1 lead 48a. Likewise, depressing the numeral "4" on dialpad 19 results in a change in the output from the Y-4 lead 48b. Only one change in output is possible at any time. The output Y-1 48a of Binary-to-Hexidecimal chip 48 is connected to one input of a two-input and gate 49 such as a (MOTOROLA)™. 4081. The other input is connected to a 100K pull-up-resistor 50 which in turn is connected to +5VDC power supply 27. Said +5VDC power supply maintains a constant "High" condition on th e AND gate 49. Output leads Y2-Y4 are connected in similar manner to similar AND gates and to the subsequent components for each telephone Co line 11. Depressing the "*" button on dialpad 19 causes a change in the output on the Y-11 lead 48C of the Binary-to-Hexidecimal converter chip 48. This is done to produce an override status, so that the next numeral depressed on dialpad 19 is allowed to be accepted by the Binary-to-Hexidecimal converter chip 48 even though that particular telephone line is on "hold" or if there is a conversation in progress. This override signal only remains active for a short predetermined time. The Y-11 output 48C of said Binary-to-Hexidecimal converter chip 48 is connected to the MR Lead of a timer chip 51, such as a (MOTOROLA)™. 14541. A time limitation is imposed by a resistor-capacitor (RC) time-constant circuit. Pin 1 of timer chip 51 has one leg of a 3.3K resistor 52 connected thereto. Pin 2 has one leg of a 0.01 ufd Capacitor 53 connected thereto. Pin 3 has one leg of a 6.8K resistor 54 connected thereto. The three open legs of these components 52, 53 and 54 are connected together and constitute the RC time-constant circuit used to cancel the override feature, if not executed within the predetermined time. The remaining leads of said timer chip 51 are connected as follows: inputs A, B, AR, and Vin are connected together and are also connected to a +5 VDC power supply 27. Pins 7, 9, and 10 are connected: to ground. Pins 4 and 11 are not connected. The output from pin 8 goes to the input of an inverter chip circuit 55. When activated, this circuit switches from a "High" to a "Low" status, which then creates a potential electrical path for the reed switch 33b within the current sensing relay 33 that senses for an "in-use" CO line 11 and thus allows a CO line 11 that has a call-in-progress or is on "hold" to be interrupted.

Activation of the Controller 15 is accomplished as follows: handset 18 is turned "on", creating a radio frequency link between said handset and base 17. Said base 17 is receiving a +17 VDC power supply 23 through its RJ-11 telephone interface 37 simulating an active telephone line. The first numeral depressed on dialpad 19 sends a DTMF signal via radio waves to said base 17. The DTMF signal received by said base is passed to the Controller 15 by means of a conventional two-conductor hardwire cable 36 comprising modular telephone plugs 35 at each end thereof, adapted to readily and conveniently connect said Controller and said base, with one end being plugged into the RJ-11 telephone interface 37 of said base and the other end plugged into the RJ-11 telephone interface 34c of said Controller. Upon entering said Controller through said interface the DTMF signal passes through coils 40a of current sensing relays 40 and thence to the 1:1,600 Ohm transformer 41, with the "Tip" side first passing through 0.33 ufd capacitor 42. Said transformer 41 removes any A.C. elements and sends a filtered DTMF signal to a 0.01 capacitor, through a half-wave rectifier 44, and then to the Ain input of a DTMF decoder chip 45 where the DTMF signal is decoded into binary signals. These binary signals are sent to Binaryto-Hexidecimal converter chip 48. The output leads of said Binary-to-Hexidecimal converter chip have a one-to-one numeric correspondence with the numerals on dialpad 19 and with DPDT relays 32 that control the path of the active CO lines 11. For example, the numeral "1" on dialpad 19 is associated, and corresponds only with DPDT relay "1" 32 which controls the path of line CO-1. With the DPDT relays 32 in the normally closed position 32b, CO-1 connects with KSU 12. When the coils of the DPDT relay 32d are energized, line CO-1 is connected to base 17 and ultimately to handset 18. If line CO-1 was in active use by the KSU 12, line CO-1 cannot be connected to handset 18. This feature prevents a conversation in progress on any telephone line from being accidentally interrupted.

Controller 15 cannot distinguish between a telephone line with a conversation in progress or a telephone line which has been placed on "hold". To access a telephone line that has a conversation in progress or to retrieve a telephone line that is on "hold" by the KSU 12, the star "*" button on dialpad 19 must first be depressed, followed by the numeral of the desired telephone line. The "*" button creates an override situation, which in turn connects the telephone line associated with the next numeral depressed on said dialpad, regardless of the current status of the telephone line. When the desired telephone line is selected and latched to base 19, the coil 38d of DPDT relay 38 that inject the +17 VDC power supply 23 to the "Tip" an "Ring" network becomes energized and relay 38 changes state, thereby disconnecting said +17 VDC power source from the "Tip" and "Ring" network 38a. Latching is interpreted by the output signal from an 8-input NOR gate chip 56, such as an HC 4078. The input signals are from the output of flip-flop chips 57, such as a (MOTOROLA)™. 4013, which are used to allow or deny the coil of a DPDT relay 32 that is connected to a particular telephone line. Before this signal can produce a "low" to the coil 32d of the DPDT relay 32, this low signal must first pass through a relay driver chip 58, such as a ULN-2004. A +12 VDC power supply 25 is connected in parallel to one side of the coils of all the 12 VDC DPDT relays 32 that are connected to active Co lines. When a "low" appears on the output of the relay driver chip circuit 58a, the electrical path is completed for the coil of the selected DPDT relay 32 to energize. When the coil 32d energizes, the electrical path changes within the selected DPDT relay 32 by shifting from the normally closed position 32b to the normally open 32c position. The output from the flip-flop chip 57 feeds the 8-input NOR gate chip 56 which in turn has an output that simultaneously feeds an inverter chip circuit 55b and a 3-input NAND gate 59. The output from said flip-flop chip 57 also feeds the input of a relay driver chip 58a. Said relay driver chip circuit connects to the coil 32d of the 12 VDC DPDT relay 32 that activates and controls the path of an active CO line. This diverts the selected CO line from the KSU 12 to base 17 and ultimately to handset 18. The output of this inverter circuit 55b is connected to a 100K pull-up resistor 60 and another relay driver circuit 58b, which in turn is connected to the coil 38d of the 12 VDC DPDT relay 38 that provides the +17 VDC "Tip" and "Ring" network of the Controller 15. The other end of this 100K pull-up resistor 60 is connected to the +5 VDC power supply 27 when the 8-input NOR gate 56 activates. This produces a "low" output on inverter circuit 55b, which in turn causes a "high" output on the relay driver circuit 58b which causes the relay coil 38d of 12 VDC DPDT relay 38 to energize, thereby removing the +17 VDC 23 from the "Tip" and "Ring" network. From the DTMF decoder chip 45, the data-valid lead (lead 12), along with the outputs D3 and D4 are connected to a 3-input NAND gate 59b, and in this manner, are utilized to detect signals resulting from depressing the pound "#" button on dialpad 19. The resultant output of said NAND gate circuit serves as an input to another 3-input NAND gate circuit 59c. The second input to 3-input NAND gate circuit 59c comes from a power-on-reset circuit, consisting of a 0.33 ufd capacitor 61 connected in series to ground, a 1N4148 Diode 62 connected in a parallel manner to capacitor 62, and a 47K resistor 63 connected in series to +5 VDC power supply 27. Anytime that power is first initialized to Controller 15, this power-on-reset circuit sends a momentary "low" to NAND gate circuit 59c while capacitor 62 is charging. The third input comes from reed switch 40b of current sensitive relay 40. The two coils 40a of current sensitive relay 40 are connected in series across "Tip" and "Ring" of the RJ-11 interface 34 of the Controller 15. Current flowing through coils 40a, causes the engagement of reed switch 40b of current sensitive relay 40. One leg, 40b, of said reed switch is connected to the +5 VDC power supply 27, the other leg goes to the third input of 3-input NAND gate 59c to detect signals resulting from depressing the pound "#" button on dialpad 19. The resultant output of said NAND gate circuit serves as an input to another 3-input NAND gate circuit 59c. The second input to 3-input NAND gate circuit 59c comes from a power-on-reset circuit, consisting of a 0.33 ufd capacitor 61 connected in series to ground, a 1N4148 Diode 62 connected in a parallel manner to capacitor 62, and a 47K resistor 63 connected in series to +5 VDC power supply 27. Anytime that power is first initialized to Controller 15, this power-on-reset circuit sends a momentary "low" to NAND gate circuit 59c while capacitor 62 is charging. The third input comes from reed switch 40b of current sensitive relay 40. The two coils 40a of current sensitive relay 40 are connected in series across "Tip" and "Ring" of the RJ-11 interface 34 of the Controller 15. Current flowing through coils 40a, causes the engagement of reed switch 40b of current sensitive relay 40. One leg, 40b, of said reed switch is connected to the +5 VDC power supply 27, the other leg goes to the third input of 3-input NAND gate 59c. The purpose of this circuit is to provide an automatic reset should an inactive telephone line be selected by dialpad 19. Selecting an active CO line will produce sufficient current flow through coils 40a to close reed switch 40b and connect the 3-input NAND Gate circuit 59c to the 12VDC power supply 27. Failure to select an active CO line will produce a "low" on said NAND gate, thus causing a reset. Any of the above three conditions, depressing the pound "#" button on dialpad 19, power on reset, or attempting to select an inactive CO line will cause all of the flip-flop circuits 57 to reset, releasing any energized coils 32d of DPDT relays 32 connected to Controller 15, restoring said DPDT relays 32 to their normally closed 32b position, thereby causing all CO lines 11 to be defaulted to the KSU 12.

When Controller 15 is connected to the KSU 12 in "series," as illustrated in FIG. 4, conversation privacy is assured for both the wired telephones 14 and the cordless handset 18. Connection of said Controller in "parallel," as illustrated in FIG. 5 allows joint access by the wire telephones 14 and the cordless handset 18 to the same phone line at the same time.

While there has herein been shown and described the presently preferred embodiment of the present invention, it should be understood that such has been done for purposes of disclosure and illustration only and that certain changes, modifications, alterations and adaptations may be made thereto within the scope of the appended claims.

What I claim is:

1. Apparatus for remotely controlled access from a handset of a cordless phone to a plurality of telephone lines including those serving a Key Service Unit (KSU) or Private Branch Exchange (PBX), by radio signals created by the handset of a cordless telephone comprising:

a controller adapted to accommodate a plurality of telephone lines between a demarcation terminal and said Key Service Unit (KSU) or said Private Branch Exchange (PBX), wherein said controller is connected in series or parallel to the telephone lines between said demarcation terminal and said telephones connected to said KSU or said PBX;

a cordless phone base unit connected to said controller;

a power supply connected to said controller;

wherein said controller is further adapted to rectify and regulate the voltage of said power supply to a plurality of D.C. voltages required to power the operation of said apparatus;

means for receiving DTMF signals from a radio-frequency carrier emitted by said cordless handset to activate and deactivate the function of said controller, wherein the Dual-Tone, Multi-Frequency (DTMF) signals transmitted upon depression of numeric or symbolic buttons on a dialpad of said cordless handset perform control, switching, and line selection functions at said controller, and further wherein line selection is effected by the depression of the star or asterisk "*" button and the number on the dialpad corresponding to the telephone line number which contains an incoming call; and wherein the apparatus allows the cordless handset to receive or originate calls on any telephone line connected to said controller, and wherein a plurality of cordless handsets may be connected to said apparatus.

2. The apparatus as set forth in claim 1 wherein said Controller is adapted for installation between the demarcation terminal and the KSU or PBX of a private or in-house telephone system.

3. The apparatus as set forth in claim 1 wherein the installation of said Controller in "series" with the telephone lines, between said demarcation terminal and said KSU or PBX, allows conversation privacy for both the cordless and the wired telephone(s) on any CO line.

4. The apparatus as set forth in claim 1 wherein the installation of said Controller in "parallel" with the telephone lines, between said demarcation terminal and said KSU or PBX allows joint use and non-private conversation for both the cordless and the wired telephones on any CO line.

5. The apparatus as set forth in claim 1 wherein the function of said controller is passive until activated by a DTMF control signal transmitted by said cordless phone handset.

6. The apparatus as set forth in claim 1 wherein said Controller is adapted to be switched from passive to active mode by the transmission of a DTMF signal upon the carrier wave emitted by said cordless phone handset when the power switch of said handset is switched to the "on" position.

7. The apparatus as set forth in claim 1 wherein calls may be received on any line connected to said Controller by depressing the numeral correspondent to the calling line number on the cordless phone handset dialpad.

8. The apparatus as set forth in claim 1 wherein calls may be originated on any line connected to said Controller by depressing the numeral correspondent to the desired line number on the cordless phone handset dialpad.

9. The apparatus as set forth in claim 1 wherein returning the power switch on the cordless handset to the "off" position disconnects said handset from all lines and returns said Controller to a passive mode.

10. The apparatus as set forth in claim 1 wherein said Controller is adapted for compatibility with any type of 1A2 or electronic telephone system.

11. A method for providing selective access and connection by a singular, or any number of, remotely located handsets of a cordless telephone capable of transmitting DTMF signals, to any one of a plurality of telephone lines, including those serving a Key Service Unit (KSU) or Private Branch Exchange (PBX) of an "in-house" telephone system through the employment of a multi-line remotely accessible Controller, comprising, in sequence, the steps of:

A) reception of incoming telephone call by operator or designated individual;

B) announcement by said designated individual on in-house audio system specifying;
  1) name or title of called party,
  2) number of telephone line,
  3) status of said line, e.g.,
    a) on line or,
    b) on hold;

C) receipt of audio message by said called party;

D) said called party turning on power switch of cordless phone handset allowing a signal to be transmitted via RF to cordless telephone base unit;

F) said RF signal is received by cordless telephone base unit and converted to an electrical impulse;

G) said electrical impulse is conducted to circuitry of a Controller by a two conductor wire;

H) said electrical impulse causing said Controller to change from passive to active mode;

I) called party depresses star or asterisk button "*" on dialpad of said handset causing DTMF signal to be transmitted to said base unit and controller;

J) called party depresses number on said handset dialpad corresponding to that of said incoming call as announced in audio message, causing the transmission of a second DTMF signal identifying the desired line;

K) said Controller interprets DTMF signals and connects line carrying incoming call to cordless phone base unit;

L) base unit establishes communication with handset by the duplex transmit/receive radio function of said base and said handset;

M) communication terminated by returning power switch of said handset to "off" position;

N) Controller returns to passive mode.

12. The method of claim 11 whereby outgoing calls on any line connected to the multi-line remotely-accessible Controller may be originated from a cordless phone handset by sequentially;

A) energizing said handset by placing power switch in "on" position,

B) depressing numeral corresponding to number of desired line wherein no dial tone indicates line in-use, select another line, C) dial number, D) terminate communication by placing handset power switch in "off" position.

13. The method as set forth in claim 11 whereby a plurality of cordless telephone handsets capable of transmitting DTMF signals may be employed in conjunction with said Multi-Line Remotely-Accessible Controller to answer or originate telephonic communication on any one of a plurality of lines connected to said Controller.

\* \* \* \* \*